(12) United States Patent
Long

(10) Patent No.: US 6,698,825 B1
(45) Date of Patent: Mar. 2, 2004

(54) SUNSHADE FOR A VEHICLE

(75) Inventor: John E. Long, Highland, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/321,961

(22) Filed: Dec. 17, 2002

(51) Int. Cl.$^7$ .................................................. B60J 7/00
(52) U.S. Cl. ..................................... 296/215; 296/97.1
(58) Field of Search .............................. 296/97.1, 97.2, 296/97.3, 97.6, 97.7, 211, 215; 160/370.21

(56) References Cited

U.S. PATENT DOCUMENTS

| | | | |
|---|---|---|---|
| 2,810,604 A | * 10/1957 | Francis | 296/97.3 |
| 5,324,090 A | * 6/1994 | Lehnhoff | 296/95.1 |
| 5,333,665 A | 8/1994 | Safar | |
| 5,570,542 A | 11/1996 | Cameron | |
| 5,609,387 A | 3/1997 | Stallfort et al. | |
| 5,768,826 A | * 6/1998 | Wilcher et al. | 49/61 |
| 6,179,034 B1 | 1/2001 | Fuss | |
| 6,247,518 B1 | 6/2001 | Wickersty | |
| 6,332,644 B1 | 12/2001 | Ito et al. | |
| 6,439,638 B1 | * 8/2002 | Kawasaki et al. | 296/97.2 |
| 6,450,560 B1 | 9/2002 | Sturt et al. | |

* cited by examiner

*Primary Examiner*—Joseph D. Pape
(74) *Attorney, Agent, or Firm*—Carlson, Gaskey & Olds

(57) ABSTRACT

A sunshade for a roof assembly in a vehicle includes a substrate having a plurality of tube members arranged parallel to each other. The axes of the tube members are positioned at an oblique angle relative to a plane of the substrate. The oblique orientation reduces the amount of light flow into the vehicle through the opening across which the sunshade extends. In one example, polygonal tube members establish a honeycomb-like structure that is rigid and self-supporting. The inventive sunshade allows for reduced light transmission through an opening in a vehicle while still allowing ventilation through that opening.

16 Claims, 2 Drawing Sheets

SUNSHADE FOR A VEHICLE

BACKGROUND OF THE INVENTION

In general terms, this invention relates to a sunshade for a vehicle.

Automotive vehicles come in a variety of styles. Most all vehicles have windows while some also include openings through a roof surface such as a sunroof or moon roof. In the case of a sunroof, a rigid, glass or plastic panel is used to close off the opening in the roof as desired. To reduce the sun load within the vehicle, a shade typically is supported as part of the headliner that can be selectively closed to block off the opening to reduce or eliminate sunlight coming in through the sunroof panel. One shortcoming of such shades is that they do not allow in any light in a fully closed position. Further, when such a shade is closed, it does not allow ventilation through the roof opening.

In the case of a moon roof, when the panel is closed, no light enters the vehicle. Accordingly, the position of the panel is typically selected to control the amount of incoming light, ventilation or both.

There have been other proposed arrangements. Mesh sunshades have been attempted, but with limited success. Typical mesh fabrics tend to vibrate too much while the vehicle is moving, for example. Such mesh fabrics, however, do provide the advantage of allowing some light blocking while allowing some ventilation through the roof opening.

There is a need for an improved sunshade for a vehicle that is particularly well suited for use in conjunction with an opening in a roof that allows for some light transmission and ventilation through the roof opening. This invention addresses that need while avoiding the shortcomings and drawbacks of previous arrangements.

SUMMARY OF THE INVENTION

In general terms, this invention is a sunshade for an opening in a vehicle that reduces the amount of light transmission through the opening and allows airflow through the opening. The inventive arrangement includes a plurality of tube members that are aligned at an oblique angle to the corresponding vehicle surface such as the roof surface.

One sunshade designed according to this invention includes a substrate that is generally planar and has a plurality of parallel tube members. Each tube member has an opening extending along an axis that is at an oblique angle relative to the plane of the substrate. In one example, the tube members each comprise a polygon that shares at least one side with at least one adjacent tube member. In one particular example, the tube members are arranged in a honeycomb pattern across the substrate.

Having the tubes aligned at an oblique angle relative to the plane of the substrate reduces the amount of light transmission and provides advantageous air flow to allow ventilation through the roof opening while avoiding undesirable noise or movement of the sunshade while the vehicle is in motion and the sunshade extends across the opening.

A roof assembly designed according to this invention includes a substantially rigid roof surface that has an opening through at least a portion of that surface. A sunshade is supported for selective movement into a position where the sunshade is aligned with and extends across at least a part of the opening. The sunshade has a plurality of parallel tube members. Each tube member has an opening extending along an axis that is at an oblique angle relative to the rigid roof surface.

In one example, tracks are supported along opposite sides of the opening in the roof surface. The sunshade includes side edges that are received at least partially within the tracks such that the sunshade is slidable into the various positions available for reducing the amount of light transmission through the opening.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
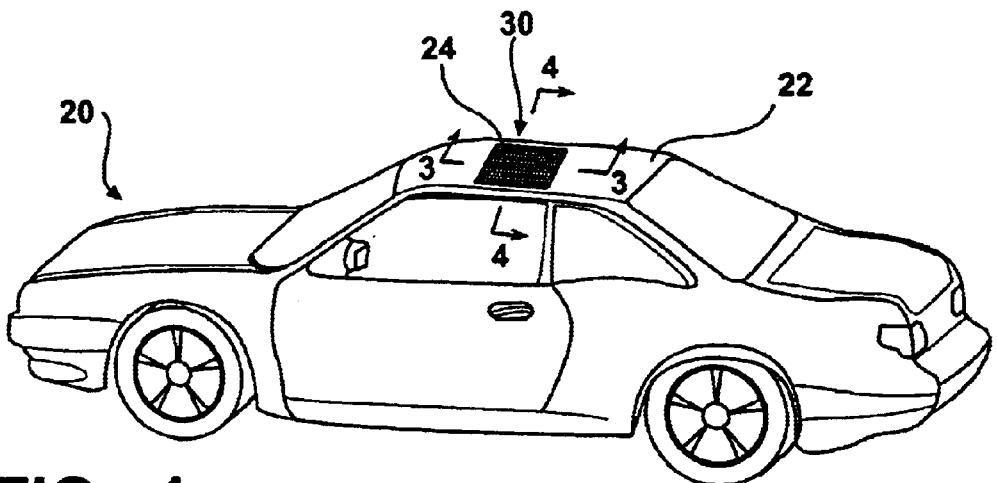
FIG. 1 schematically illustrates a vehicle including a roof assembly designed according to this invention.

FIG. 1 illustrates a vehicle 20 with a roof assembly that includes a rigid roof surface 22. An opening 24 is formed in the roof surface in a conventional manner to provide a sunroof or moon roof configuration, for example.

A sunshade 30 is selectively positionable to extend across at least a portion of the opening 24. The sunshade 30 operates to reduce the amount of light transmission into the vehicle interior through the opening 24. The sunshade 30 simultaneously allows airflow through the opening 24.

Figure 2:
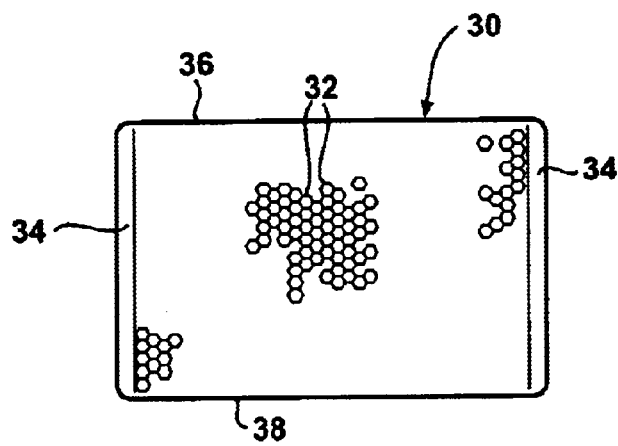
FIG. 2 is a elevational view of an example sunshade designed according to this invention.
Figure 3:
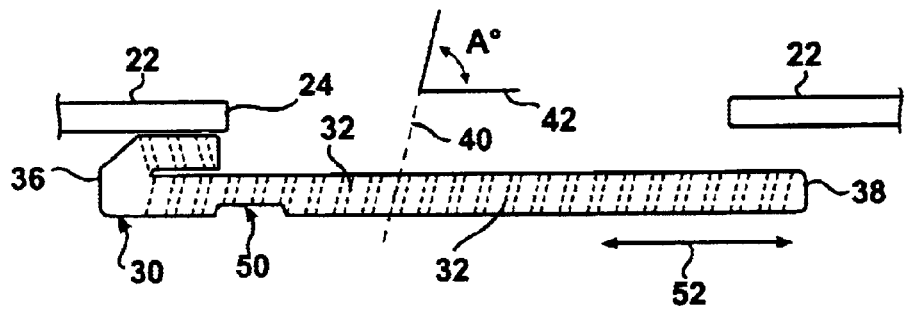
FIG. 3 is a cross-sectional illustration taken along the lines 3—3 in FIG. 1.

Referring to FIGS. 2 and 3, the sunshade 30 comprises a substrate having a plurality of tube members 32. In the illustrated example, each tube member is a hexagon that shares at least one side with at least one adjacent tube member. The illustrated arrangement includes a so-called honeycomb structure comprising a plurality of tube members secured together to establish the honeycomb structure.

In one example, the sunshade 30 substrate is made from a Bayer Baypreg honeycomb structural composite. The inventive arrangement may utilize a variety of plastic materials that are capable of establishing a plurality of tube members 32. The material selected and the dimensions of the tube members 32 in one example establish a sunshade substrate that is generally rigid and self-supporting so that no additional framing is required to have a stable sunshade. Those skilled in the art who have the benefits of this description will be able to select from among commercially available materials and known methods for establishing honeycomb-like substrates to meet the needs of their particular situation.

One advantage of the illustrated arrangement is that the substrate having polygon-shaped tube members 32 is rigid and self-supporting. No additional framing or other mechanical components are required to achieve the desired stiffness of the substrate so that the sunshade 30 remains in a desired position and orientation within a vehicle even while extending across the opening 24 in the roof surface 322.

The illustrated example includes two oppositely facing side edges 34, a front edge 36 and a real edge 38. The terms "front" and "rear" are used in this discussion relative to the front and rear of a vehicle, for example. They are not to be construed in a limiting sense, however.

As best appreciated from FIG. 3, each tube member 32 is aligned at an oblique angle relative to a plane within which the substrate of the sunshade 30 lies. A central axis 40 of the tube members 32 in the illustrated arrangement is at an angle A relative to a plane 42 of the rigid roof surface 22. The term oblique should be construed to include any angle between 0° and 90°. Those skilled in the art will recognize that roof surfaces and sunshades designed according to this invention will not necessarily be truly planar. The term "planar" as used in this description includes slight curvatures to a surface to accommodate the aerodynamic or styling contours of a vehicle roof assembly, for example. Accordingly, the terms "planar" and "plane" should not be construed in their strictest sense.

The oblique orientation of the tube members 32 relative to the plane of the roof surface 22 across the opening 24 reduces the amount of sunlight entering the vehicle interior through the opening 24. The angle A preferably is selected to provide a desired amount of light transmission into the vehicle. Those skilled in the art will be able to select the angle that best satisfies their needs. Similarly, the length of the tube members 32, which is dictated in part by the thickness of the substrate, may be varied as needed. In one example, the angle A is 45° and the substrate is between 6 mm and 8 mm thick.

The axes 40 of the illustrated tube members 32 are aligned in a direction where the outer edge (i.e., that facing the opening 24) of each tube member is closer to the rear side of the opening 24 than a lower end (i.e., that facing toward the interior of the vehicle). This angular orientation provides additional light filtering characteristics while still allowing airflow into the vehicle.

Further, the illustrated orientation reduces the amount of whistling or other airflow noise that may otherwise occur while the vehicle is moving. With the inventive sunshade, the amount of light allowed through the opening 24 may be reduced while still enjoying the ventilating effects of having the sunroof or moon roof in an open position.

In FIG. 3, the sunshade 30 extends across the entire opening 24. A handle portion 50 preferably is formed in an underside (according to the drawing) of the sunshade, which faces toward the interior of the vehicle. In one example, a premade cup handle is secured to the substrate of the sunshade 30 in the desired position. In another example, the substrate material, itself, is formed to establish a cup handle that facilitates an individual manually sliding the sunshade 30 to the front or rear according to the arrows 52 (i.e., to the left or right according to the drawing) to move the shade into the desired position. In the example of FIG. 3, the front edge 36 includes a folded over portion to establish a cleaner edge and some additional structural rigidity in the vicinity of the handle recess 50.

Figures 4, 5:
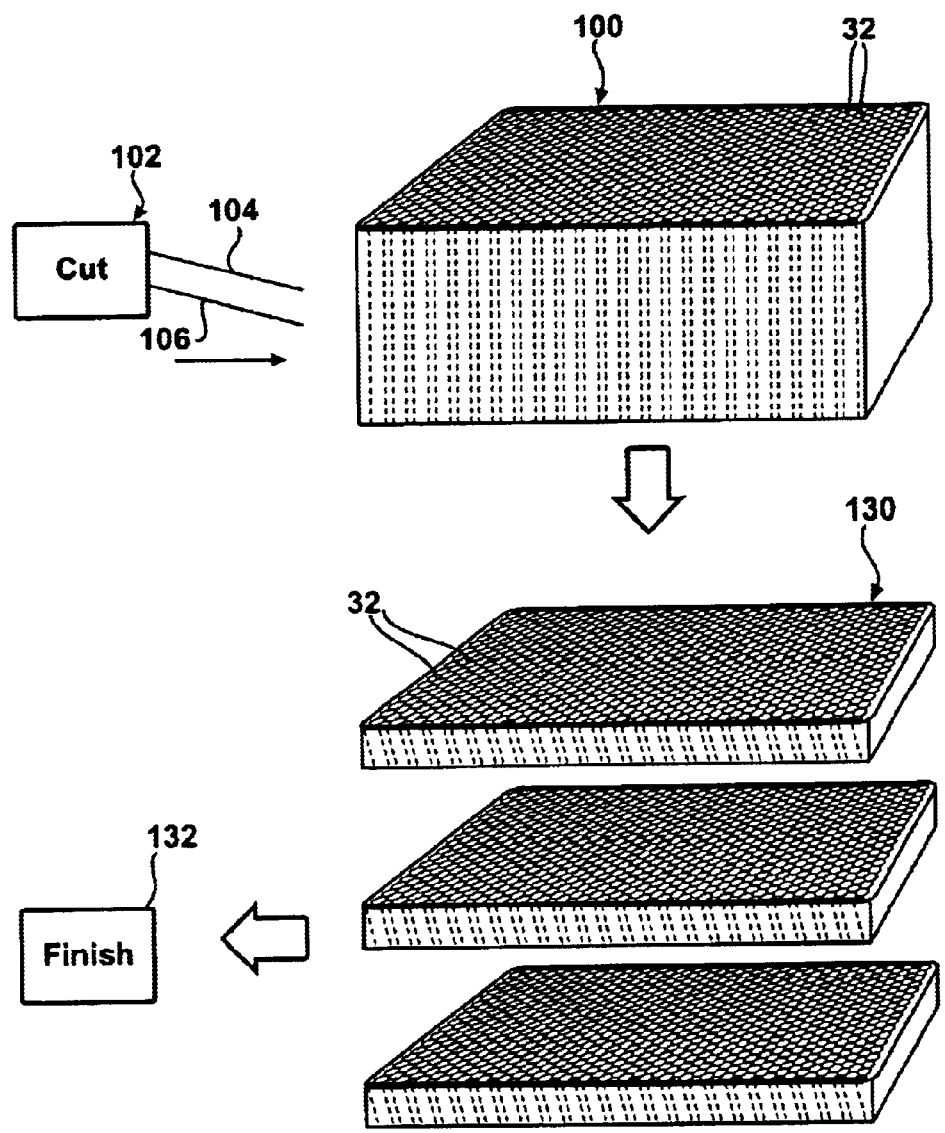
FIG. 4 is a cross-sectional illustration taken along the lines 4—4 in FIG. 1.
FIG. 5 schematically illustrates one example method of making a sunshade designed according to this invention.

FIG. 4 schematically illustrates another feature of one example sunshade designed according to this invention. In this example, tracks 56 established by guiding members 58 are supported as part of the roof assembly in a conventional manner. The side edges 34 of the sunshade 30 have a reduced thickness compared to the central body of the sunshade substrate. The reduced thickness of the side edges 34 allow them to conveniently slide within the tracks 56 so that the sunshade 30 may be moved into a selected position relative to the opening 24.

In one example, the substrate of the sunshade 30 comprises a plastic material. The side edges 34 may be formed by compressing corresponding portions of the substrate to establish the desired thickness and contour to meet the needs of a particular situation. The edges 36 and 38 may be configured in a variety of manners to meet the needs of a particular situation.

In one example, the inventive sunshade is established by injection molding a suitable material to form the desired size, shape and contour of the sunshade 30. Another example method of making a sunshade designed according to this invention is schematically shown in FIG. 5. A block 100 of the substrate material is formed to have the desired honeycomb or other configuration of adjacent tube members 32. The block is then cut at an angle which is oblique to the tube member axes, using a cutting device 102. In the illustration, blades 104 and 106 penetrate through the block 100 at an oblique angle to the axes of the tube members 32. The blades 104 and 106 preferably operate to cut through the block 100 of substrate material to establish the desired thickness of the sunshade 30. By cutting at an oblique angle, the eventual sunshade has tube members at an oblique angle relative to the plane of the substrate.

After the slicing operation, a plurality of substrates 130 have the desired thickness of the eventual sunshade 30. In one example, the central body portion of the sunshade has a thickness in a range from about 6 millimeters to about 8 millimeters. Those skilled in the art who have the benefit of this description will be able to select the appropriate dimensions to meet the needs of their particular situation. The substrates 130 preferably are finished at a finishing station 132 where the side edges 34, for example, can be formed. Whatever other finishing is needed for a given situation may be accomplished in a known manner. For example, a finish fabric may be secured to one or both sides of the sunshade to achieve a desired visual appearance. One advantage to a sunshade designed according to this invention, however, is that a finished fabric is not required to achieve the benefits provided by the inventive arrangement.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:
1. A sunshade for a vehicle, comprising:
   a substrate that is generally planar and has a plurality of parallel tube members, each tube member having an opening extending along an axis that is at an oblique angle relative to the plane of the substrate.
2. The sunshade of claim 1, wherein the tube members comprise polygons each sharing at least one side with at least one adjacent tube member.
3. The sunshade of claim 2, wherein the tube members are arranged in a honeycomb pattern across the substrate.
4. The substrate of claim 1, including a handle near one edge of the substrate.
5. The sunshade of claim 1, wherein the substrate is stiff and self-supporting.
6. The sunshade of claim 1, wherein the substrate has oppositely facing surfaces and a thickness of at least a portion of the substrate between the surfaces is in the range from about 6 mm to about 8 mm.
7. The sunshade of claim 1, wherein the substrate comprises plastic.
8. The sunshade of claim 1, wherein the substrate has oppositely facing surfaces and a thickness of the substrate between the surfaces is a first dimension across a majority of the substrate and at least two oppositely facing edges of the substrate have a reduced, second dimension and wherein the edges are adapted to slide along corresponding tracks associated with a vehicle roof.

9. A vehicle roof assembly, comprising:
   a substantially rigid roof surface having an opening through at least a portion of the surface; and
   a sunshade supported for selective movement into a position where the sunshade is aligned with and extends across at least a part of the opening, the sunshade having a plurality of parallel tube members, each tube member having an opening extending along an axis that is at an oblique angle relative to the rigid roof surface.

10. The assembly of claim 9, including tracks along at least two opposite sides of the opening and wherein the sunshade includes side edges that are received at least partially within the tracks such that the sunshade is slidable between the position where the sunshade extends across at least a part of the opening and a second position where the sunshade does not extend across any portion of the opening.

11. The assembly of claim 10, wherein the sunshade has a first thickness across a majority of the sunshade and the side edges have a second, reduced thickness.

12. The assembly of claim 11, wherein the tube members along the side edges are compressed.

13. The assembly of claim 9, wherein the tube members comprise polygons each sharing at least one side with at least one adjacent tube member.

14. The assembly of claim 13, wherein the tube members are arranged in a honeycomb pattern across the substrate.

15. The assembly of claim 9, wherein the sunshade has a first surface that faces the opening and a second, oppositely facing surface that faces an interior of the vehicle, at least a portion of the sunshade having a thickness between the surfaces in the range from about 6 mm to about 8 mm.

16. The assembly of claim 9, wherein the opening has a front edge and a rear edge corresponding to front and rear sides of the vehicle, the sunshade has a first surface that faces the opening and a second oppositely facing surface that faces an interior of the vehicle and wherein each tube member has an end at the first surface that is closer to the rear edge of the opening than a second tube end.

* * * * *